US011539728B1

(12) United States Patent
Malov et al.

(10) Patent No.: US 11,539,728 B1
(45) Date of Patent: Dec. 27, 2022

(54) DETECTING CONNECTIVITY DISRUPTIONS BY OBSERVING TRAFFIC FLOW PATTERNS

(71) Applicant: Amazon Technologies, Inc., Seattle, WA (US)

(72) Inventors: Stanislav Vladimirovich Malov, Edmonds, WA (US); Arran McCabe, Seattle, WA (US); Nikolaos Pavlakis, Seattle, WA (US); Alan O'Leary, Dublin (IE); Ivan Emilov Goychev, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/820,584

(22) Filed: Mar. 16, 2020

(51) Int. Cl.
| H04L 9/40 | (2022.01) |
| H04L 43/0811 | (2022.01) |
| H04L 41/12 | (2022.01) |
| H04L 47/2483 | (2022.01) |
| H04L 47/122 | (2022.01) |
| H04L 43/16 | (2022.01) |

(52) U.S. Cl.
CPC .......... *H04L 63/1425* (2013.01); *H04L 41/12* (2013.01); *H04L 43/0811* (2013.01); *H04L 43/16* (2013.01); *H04L 47/122* (2013.01); *H04L 47/2483* (2013.01); *H04L 63/166* (2013.01)

(58) Field of Classification Search
CPC ... H04L 63/0236; H04L 63/164; H04L 41/12; H04L 41/0677; H04L 45/02; H04L 43/16; H04L 63/1408; H04L 63/1416; H04L 63/1425; H04L 47/193; H04L 69/22; H04L 9/3271; H04L 63/205; H04L 63/166; H04L 47/122; H04L 47/2483; H04L 43/12; G06F 21/577; G06F 11/079; G06F 11/3055; G06F 2201/86; H04W 12/06

See application file for complete search history.

(56) References Cited

U.S. PATENT DOCUMENTS

| 8,806,011 B1 * | 8/2014 | Graham-Cumming ...................... H04L 67/02 709/227 |
| 10,038,715 B1 * | 7/2018 | Majkowski ......... H04L 63/1416 |
| 10,237,875 B1 * | 3/2019 | Romanov ............... H04L 47/32 |
| 10,454,689 B1 * | 10/2019 | Sharifi Mehr ........ H04L 63/166 |
| 10,757,132 B1 * | 8/2020 | Powers ............ G06Q 10/06398 |

(Continued)

*Primary Examiner* — Tonia L Dollinger
*Assistant Examiner* — Linh T. Nguyen
(74) *Attorney, Agent, or Firm* — Klarquist Sparkman, LLP

(57) ABSTRACT

Network connectivity disruptions impacting users of a network, can be detected based on patterns in user network traffic and network topology data, e.g., by a monitoring server computer. Logged network traffic data can be filtered to identify anomalous data flows. The anomalous data flows can be data flows indicating connection timeouts such as failed Secure Sockets Layer/Transport Layer Security (SSL/TLS) handshakes. Sources and destinations of the anomalous data flows can be mapped to corresponding physical locations using the network topology data, and the anomalous data flows can be grouped by source and destination, in order to determine an impact or scope of a network connectivity disruption. Users of the network can be notified regarding the network connectivity disruption, and optionally, actions can be taken to reduce the impact of the network connectivity disruption.

19 Claims, 9 Drawing Sheets

(56) References Cited

U.S. PATENT DOCUMENTS

| | | | | |
|---|---|---|---|---|
| 10,812,468 | B2 * | 10/2020 | Raman | H04L 29/08 |
| 11,126,492 | B1 * | 9/2021 | Graklanoff | G06F 11/3452 |
| 2002/0062333 | A1 * | 5/2002 | Anand | H04L 69/22 |
| | | | | 718/105 |
| 2003/0061510 | A1 * | 3/2003 | Hartmann | H04L 63/0823 |
| | | | | 726/23 |
| 2004/0066747 | A1 * | 4/2004 | Jorgensen | H04L 12/4641 |
| | | | | 370/241 |
| 2011/0119517 | A1 * | 5/2011 | Beeco | G06F 1/28 |
| | | | | 713/340 |
| 2012/0233311 | A1 * | 9/2012 | Parker | H04L 63/1425 |
| | | | | 709/224 |
| 2013/0074183 | A1 * | 3/2013 | Yoon | G06F 21/00 |
| | | | | 726/22 |
| 2014/0115706 | A1 * | 4/2014 | Silva | H04L 63/1491 |
| | | | | 726/23 |
| 2016/0226731 | A1 * | 8/2016 | Maroulis | G06F 11/3006 |
| 2017/0124478 | A1 * | 5/2017 | Baradaran | G06F 16/285 |
| 2017/0295196 | A1 * | 10/2017 | Arnell | H04L 29/06 |
| 2019/0363965 | A1 * | 11/2019 | Tewari | H04L 43/0841 |
| 2021/0026722 | A1 * | 1/2021 | Bhatia | G06F 11/079 |
| 2021/0400020 | A1 * | 12/2021 | Lazri | H04L 63/0263 |

* cited by examiner

DETECTING CONNECTIVITY DISRUPTIONS BY OBSERVING TRAFFIC FLOW PATTERNS

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or the ability to adapt rapidly to changing computing resource needs.

Some compute service providers and other entities provide monitoring services that detect adverse network events. Adverse network events can include, for example, packet loss and/or increased latency affecting traffic in certain areas of the network. However, certain types of adverse network events can be more difficult for monitoring services to detect. For example, monitoring services may have difficulty detecting network connectivity disruptions. Further, some monitoring services operate by sending synthetic traffic through the network, rather than directly measuring how users are experiencing the network.

DETAILED DESCRIPTION

Network anomalies such as connectivity disruptions can be determined by a monitoring service based on patterns detected in user network traffic data and network topology data. In particular, the monitoring service can receive flow logs from users of a network (e.g., a network operated by a compute service provider), the flow logs including user data flows. The respective user data flows can include source and destination information, a number of bytes sent to the destination, and a number of bytes returned by the destination, among other data. The monitoring service can filter the user data flows to identify anomalous data flows, e.g., data flows indicating a connection timeout with the destination. The anomalous data flows can be grouped by source and destination, among other parameters. The sources and destinations of the groups of anomalous data flows can be mapped to physical locations using the network topology data. Based on the mapping, the monitoring service can determine the scope of a network anomaly and/or determine an impact of the network anomaly on one or more users of the compute service provider. Optionally, the monitoring service can notify the impacted users of the network anomaly and/or take steps to reduce the impact of the network anomaly, such as redirecting user network traffic away from network areas or services impacted by the network anomaly.

Further, temporal aggregations of the network anomalies (e.g., based on endpoint and physical server location) can be used to identify large scale network and/or application disruptions. By grouping the anomalous data flows occurring during a given time frame by source and destination, the monitoring service can determine whether a network anomaly is occurring at the source, the destination, or somewhere in between. For example, upon determining that numerous instances located in a common network area are failing to establish connections with disparate destination endpoints, the monitoring service can determine that an ongoing network event is affecting that network area. Accordingly, by making such determinations, the monitoring service can identify and attribute user-impacting adverse network events and measure their scope.

Figure 1:
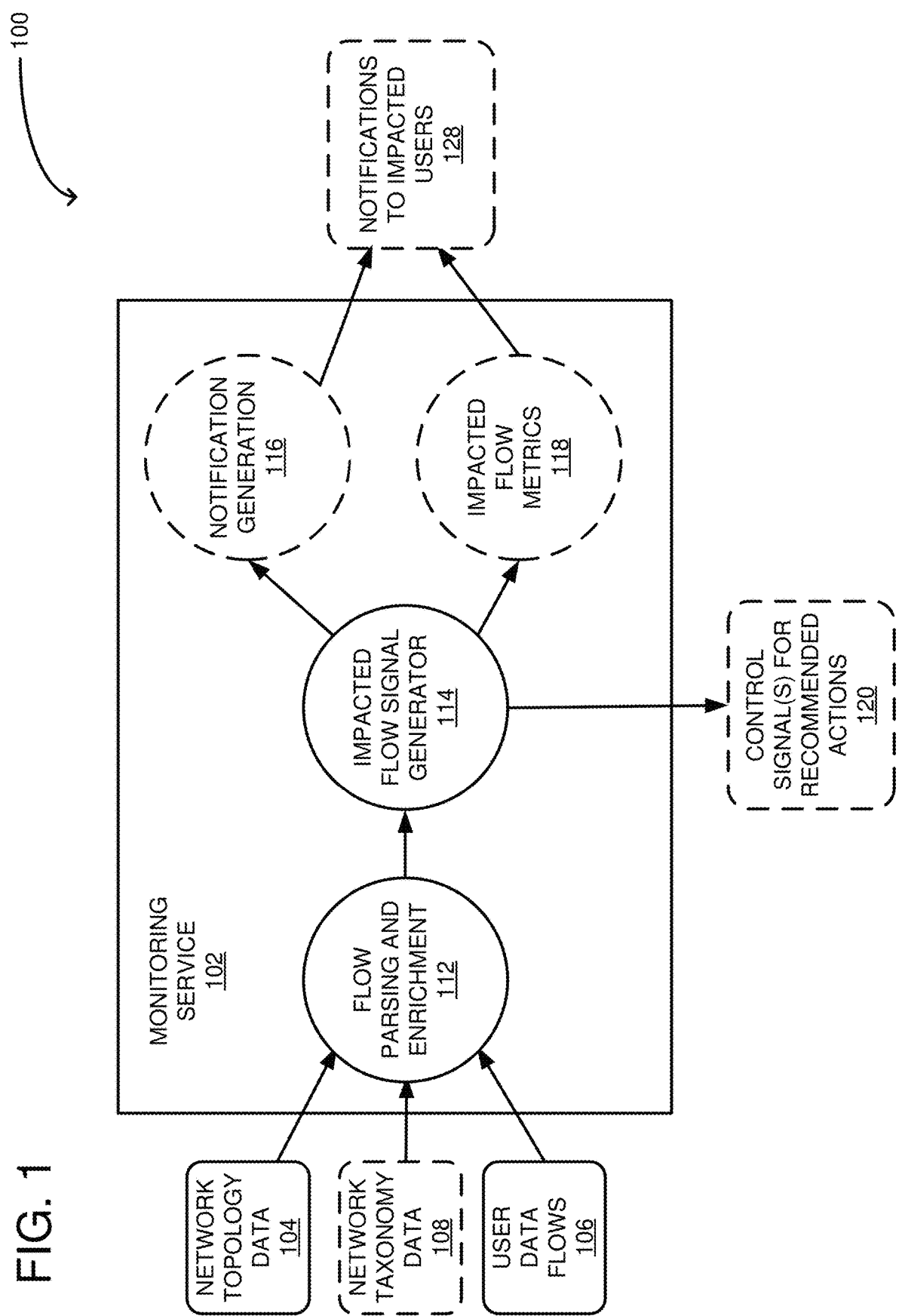
FIG. 1 shows an example workflow diagram for detecting connectivity disruptions by observing traffic flow patterns of users of a network.

FIG. 1 is a workflow diagram 100 for detecting connectivity disruptions by observing traffic flow patterns of users of a computer network. As shown, a monitoring service 102 can receive one or more inputs and perform various actions on the inputs to produce one or more outputs. Monitoring service 102 can be implemented by one or more server computers. In some examples, the users are users of a compute service provider, and the one or more server computers are associated with the compute service provider. In other examples, the users are associated with particular services or applications operating on the computer network.

As shown, the inputs to monitoring service 102 can include network topology data 104 and user data flows 106. Optionally, the inputs can also include network taxonomy data 108. Monitoring service 102 can also receive other inputs without departing from the scope of this disclosure.

Network topology data 104 can include data providing a representation or model of the physical topology of the computer network. Computer networks generally comprise various interconnected computing devices that can communicate with each other via packets to exchange data. When small numbers of devices are interconnected, the devices can be directly connected to each other. For example, one device can be directly connected to another device via a network link and the devices can communicate by sending packets to one another over the network link. However, direct connections between large numbers of devices is generally not scalable. Thus, the connections between large numbers of devices will typically be via indirect connections. For example, one device can be connected to another device via an interconnection network comprising one or more routers. Large routers for connecting many devices together can be expensive. However, large routers can be constructed from lower cost commodity equipment interconnected as a network fabric. A network fabric can include multiple network devices interconnected by multiple network links. Network devices can include devices configured that can originate, transmit, receive, forward, and/or consume information within the network. For example, a network device can be a router, a switch, a bridge, an endpoint, or a host computer. The network fabric can be architected or organized in various ways which can be described by a topology of the network. Specifically, the topology of the network can describe the connectivity of the network devices and links that form the network. As one example, the network fabric can be organized as a hierarchy of interconnected components. In particular, the network devices can be organized by rows or tiers, as discussed further below with reference to FIG. 3. The network devices within a tier are generally not directly connected to each other, and the network devices within a given tier can be fully or partially connected to a neighboring tier. Thus, the different devices within a tier can provide redundant connections to a neighboring tier to potentially increase bandwidth and/or availability between the tiers. Additionally or alternatively, the network devices can be grouped into logical devices. For example, the network devices can be grouped into logical devices that describe the connectivity of the devices within the group. Exemplary logical devices can include multi-tier architectures such as Clos, folded-Clos, fat-tree, butterfly, flattened-butterfly, and dragonfly networks.

The network topology data can include data regarding network devices of the network as well as possible links or paths available between the network devices, which can be based on a routing strategy such as equal cost multipath (ECMP) routing or shortest-path routing. The network topology data can also include address information for the network devices or groups of network devices, e.g., prefixes for top-of-rack (TOR) routers. In some examples, the representation of the network provided by the network topology data is a "zoomed out" representation, in which network devices that share a common function are grouped together (as opposed to a representation depicting each individual network device).

In some examples, network topology data 104 is updated frequently to reflect changes to the network, and updated network topology data is provided to the monitoring service as it becomes available or responsive to a request from the monitoring service. The network topology data can be generated by a service external to the monitoring service.

User data flows 106 can include records of network traffic associated with the users. The user data flows can be aggregated as flow logs. In some examples, flow logs of user data flows can be generated at virtual machine instances. In other examples, flow logs of user data flows can be generated at non-virtual (physical) machine instances (e.g., server computers), or at routers. Such flow logs can include data regarding the user data flows that occurred during a specified time period. The user data flows can include records of Layer 3 and 4 traffic and metering information associated with the users. In particular, the user data flows can provide information on network interactions associated with users. The information included in a given user data flow can include, for example, source and destination information for the user data flow, a destination port of the user data flow (e.g., port 443 for HyperText Transfer Protocol Secure (HTTPS)), a protocol utilized by the user data flow (e.g., protocol 6 corresponding to the Transmission Control Protocol (TCP)), a number of bytes sent from the source to the destination, a number of bytes returned from the destination to the source, a period of time associated with the user data flow, and/or a routing protocol status (e.g., TCP status). The source information for a given user data flow can include, for example, an Internet Protocol (IP) address associated with the source of the user data flow (e.g., the IP address of a hypervisor running an instance that originated the user data flow). As discussed further below with reference to FIG. 2, an "instance" can refer to a virtual machine which functions as an instance of a software implementation of a machine (i.e. a computer) and executes applications like a physical machine, or alternatively, to a physical machine such as a server computer. Similarly, the destination information for a given user data flow can include, for example, an IP address associated with a destination or endpoint of the user data flow (e.g., the IP address of a hypervisor running a user instance to which the user data flow was sent). In some examples, the user data flows are collected by a network traffic data collection service, such as network traffic data collection service 222 of FIG. 2. The network traffic data collection service can include software that runs on individual user instances and collects traffic data associated with the user instances, or software that runs on routers and collects traffic data for traffic traversing the routers. The data collection service can generate parcels, each parcel carrying data (e.g., for a given user or user instance) regarding network traffic that occurred during a specified interval of time such as 5-10 minutes.

Optional network taxonomy data 108 can include subnet-based information pertaining to front-end IP address ranges, which can be used to enrich or classify the sources and destinations of user data flows. The information can include supplementary information that can be used to map the source or destination of a user data flow to a physical location. The physical location can be associated with a network operated by a compute service provider, or another autonomous network. The mapping can involve use of IP subnet(s) or other subnet database(s) which map to approximate GPS coordinates. The network taxonomy data 108 can be used to resolve the order of an IP address (e.g., server, network area, service, specific user, geographic location, autonomous system) associated with the source or destination of a user data flow to something meaningful.

In the depicted example, monitoring service 102 includes a plurality of sub-services, each sub-service performing a designated function. The sub-services of monitoring service 102 include a flow parsing and enrichment sub-service 112 which receives as inputs the network topology data 104, user data flows 106, and optional network taxonomy data 108. The parsing performing by flow parsing and enrichment sub-service 112 can include aggregation and filtering of the user data flows. For example, the flow parsing and enrichment sub-service 112 can filter the user data flows to a subset of the user data flows meeting specified criteria. This can include filtering the user data flows to identify a subset of the user data flows which indicate connection timeouts. Connection timeouts can include failed attempts by a source to connect to a destination (e.g., an external HTTP/HTTPS endpoint such as an HTTP/HTTPS service), and can be indicated by a source sending packets to a destination and receiving no packets in return. Specific examples of connection timeouts include failed Secure Sockets Layer/Transport Layer Security (SSL/TLS) handshakes, unanswered Domain Name System (DNS) requests, TCP resets, or unanswered TCP synchronization requests.

Further, the flow parsing and enrichment sub-service 112 can group the filtered user data flows based on information contained in the user data flows, such as source (e.g., source IP address), destination (e.g., destination IP address), and time (e.g., a time when the user data flow was initiated or a period of time during which the user data flow occurred). Accordingly, the filtering and grouping performed by the flow parsing and enrichment sub-service 112 can produce one or more groups of user data flows. Each of the groups can include user data flows meeting the filter criteria (e.g., user data flows indicating failed SSL/TLS handshakes) and each group can include user data flows with one or more shared parameter values (e.g., user data flows from a common source that occurred during a specified time period, user data flows with a common destination that occurred during a specified time period, user data flows from a common source to a common destination that occurred during a specified time period, etc.).

The groups of filtered user data flows produced by the flow parsing and enrichment sub-service 112, or the user data flows themselves, can be enriched by the flow parsing and enrichment sub-service 112 based on network topology data 104, and optionally, network taxonomy data 108. For example, the flow parsing and enrichment sub-service 112 can enrich the source and destination data in the user data flows with network topology data regarding the sources and destinations of the user data flows, e.g., information regarding network areas in which the source and destination addresses in the user data flows are disposed and/or network services associated with the source and destination addresses. The enrichment of the user data flows or groups of user data flows based on the network topology data and/or network taxonomy data can alternatively be referred to as "mapping" the user data flows or groups of user data flows to corresponding physical locations. For example, a source IP address associated with a user data flow or group of user data flows, can be mapped to a particular physical area of a network. As another example, a destination IP address associated with a user data flow or group of user data flows, can be mapped to a particular physical area of a network.

The enrichment step can also optionally include identifying a service associated with a physical location. For example, a destination IP address associated with a group of user data flows can be mapped to a particular physical network device, and that network device can in turn be mapped to or associated with a particular service. This can make it possible to identify network anomalies associated with specific network services, in addition to network anomalies associated with specific network areas or links between network areas.

As used herein, a "network anomaly" can refer to various types of observable data flow issues that occur in a network environment, which include but are not limited to connection timeouts. The terms "network impairment" can be used in a similar manner, and the term "service impairment" can refer to various types of observable data flow issues that affect an application or service implemented in a network environment. Example network anomalies include SSL/TLS anomalies, DNS lookup failures (e.g., requests to DNS to resolve a domain name to an IP address that go answered), packet misordering issues (e.g., arrival of packets out-of-order based on their TCP sequence numbers), elevated TCP retransmits (e.g., a server having to transmit packets as they are going unacknowledged by the receiver), high levels of connection churn (e.g., large numbers of connections being established/terminated within a short period of time), latent connections (e.g., flows having a high latency between packets being sent and acknowledged), packet loss, etc. Such network anomalies, either individually or in combination, can be used to identify data flows that are degraded in some way.

In some examples, the flow parsing and enrichment sub-service 112 can also map user data flows or groups of user data flows to physical locations external to the network. This can include mapping destination IP addresses of user data flows or groups of user data to physical locations external to the network, or to external services (e.g., services hosted by entities other than a compute service provider operating the network, or services hosted on external networks such as the Internet).

The flow parsing and enrichment sub-service 112 can produce outputs such as groups of filtered user data flows which have been mapped to physical locations within the network (e.g., network areas), network services, physical locations external to the network, or services external to the network. The outputs produced by the flow parsing and enrichment sub-service 112 can be provided to an impacted flow signal generator sub-service 114. Impacted flow signal generator sub-service 114 can then make determinations (e.g., inferences) regarding connectivity disruptions impacting the network based on this information.

In one non-limiting example, the flow parsing and enrichment sub-service 112 can filter the user data flows 106 to identify a subset of user data flows which indicate a network anomaly such as a connection timeout (e.g., a TCP-based anomaly). The flow parsing and enrichment sub-service 112 can group this subset of user data flows by source, destination, and time, and map the resulting groups of user data flows to physical network locations (e.g., network areas). This mapping can result in one or more groups of user data flows that occurred during a particular interval of time and are associated with respective source network areas, and one or more groups of user data flows that occurred during a particular interval of time and are associated with respective destination network areas (or services). Upon receiving the groups of user data flows, the impacted flow signal generator sub-service 114 can determine (e.g., infer) that traffic involving a particular network area or service, or traffic between particular network areas or services, is impacted by a network anomaly. As discussed further below with reference to FIG. 4, this can include the impacted flow signal generator sub-service counting a number of user data flows in each group of anomalous user data flows, and inferring a problem with the source, destination, or source-destination pair of associated with the group when the number of user data flows in the group is greater than a predefined threshold.

The outputs produced by the impacted flow signal generator sub-service 114 can take various forms. For example, the outputs can include a determined (e.g., inferred) scope of impact of a network anomaly, where the scope encompasses a portion of a network (e.g., a network area), one or more particular network devices, a particular service hosted by the network, a particular service or endpoint external to the network, or a particular path between network devices or areas. As another example, the outputs can include a determined (e.g., inferred) impact of a network anomaly on one or more users. The determined impact can include an indication of which users are impacted, which service(s) or network areas in particular are impacted, a severity of the impact, an estimated duration of the impact, etc. As yet another example, the outputs can include identification of a network area or service (or a location external to the network) experiencing connectivity degradation.

As shown, the outputs produced by the impacted flow signal generator sub-service 114 can optionally be provided to a notification generation sub-service 116 and an impacted flow metrics sub-service 118. Notification generation sub-service 116 can generate and output notifications to impacted users 128. For example, the notifications can be provided to user interfaces (UIs) accessible to the users. In some examples, the notifications provided to the impacted users can provide a narrative description of the network anomaly. The narrative description can include, for example, an indication of one or more of the nature of the network anomaly, the severity of the network anomaly, the network area(s) or service(s) (or external locations/services) affected by the network anomaly, the scope of the network anomaly, and/or a current status of the network anomaly.

Impacted flow metrics sub-service 118 can use the information received from impacted flow signal generator sub-service 114 to generate metrics regarding the network anomaly. The metrics can include information relating the number of connections of a particular type that were successful to the number of connections of the particular type that were unsuccessful (as determined based on data in the user data flows). As just a few examples, the information can include a ratio of connection successes to failures (e.g., successful SSL/TLS handshakes to unsuccessful SSL/TLS handshakes) for a portion of the network (e.g., a particular source or destination) or the entire network, a ratio of connection successes to failures for user data flows towards the Internet or towards a particular Internet address, a ratio of connection successes to failures for user data flows towards a particular service, a ratio of connection successes to failures for user data flows towards a particular externally-hosted service, or a ratio of DNS lookup successes to failures for some portion of the network or the entire network. As shown, the generated metrics can be included in notifications to impacted users 128. In other examples, the generated metrics can serve other purposes or be provided to other entities, such as entities that provide network health data to users of the network or administrators of the network.

Additionally or alternatively, the outputs produced by the impacted flow signal generator sub-service 114 can include, or can be used to generate, control signals for recommended actions 120. The recommended actions can include actions to be taken to reduce the impact of network anomalies on one or more users impacted by the network anomalies. The actions can include, for example, the user moving their resources (or agreeing to have their resources moved by an entity such as a compute service provider) to a portion of the network that is not affected by the network anomalies.

In other examples, the monitoring service 102 can receive different inputs and/or produce different outputs. Similarly, the monitoring service 102 can include additional sub-services, or can omit some of the depicted sub-services, without departing from the scope of this disclosure.

Figure 2:
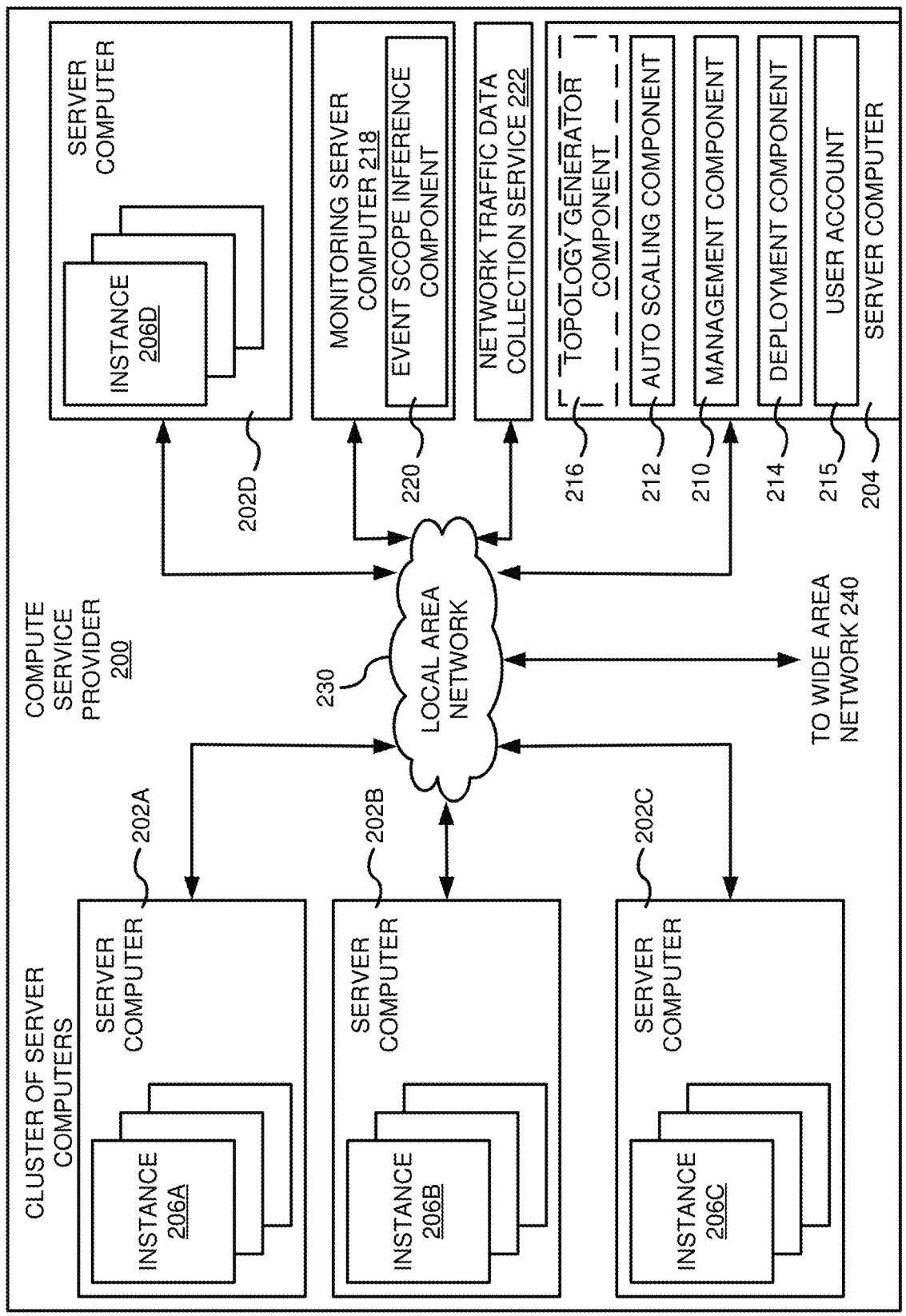
FIG. 2 shows an example system diagram including a plurality of instances running in a multi-tenant environment.

FIG. 2 is a computing system diagram of a network-based compute service provider 200 that illustrates one environment in which embodiments described herein can be used. By way of background, the compute service provider 200 (i.e., the cloud provider) is capable of delivery of computing and storage capacity as a service to a community of end recipients, alternatively referred to herein as users. In an example embodiment, the compute service provider can be established for an organization by or on behalf of the organization. That is, the compute service provider 200 may offer a "private cloud environment." In another embodiment, the compute service provider 200 supports a multi-tenant environment, wherein a plurality of users operate independently (i.e., a public cloud environment). Generally speaking, the compute service provider 200 can provide the following models: Infrastructure as a Service ("IaaS"), Platform as a Service ("PaaS"), and/or Software as a Service ("SaaS"). Other models can be provided. For the IaaS model, the compute service provider 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 200 using networked client devices, such as desktop computers, laptops, tablets, smartphones, etc. running web browsers or other lightweight client applications. Those skilled in the art will recognize that the compute service provider 200 can be described as a "cloud" environment.

While FIG. 2 shows an example in which a compute service provider implements a monitoring service for its users, the monitoring service can be implemented in other scenarios as well without departing from the scope of this disclosure. For example, the monitoring service can be implemented in on-premise data centers or outsourced data centers, local area networks, etc. In such examples, the users of the monitoring service can be specific network services, rather than users (e.g., customers) of a compute service provider.

The particular illustrated compute service provider 200 includes a plurality of server computers 202A-202D. While only four server computers are shown, any number can be used, and large centers can include thousands of server computers. The server computers 202A-202D can provide computing resources for executing software instances 206A-206D. In one embodiment, one or more of the instances 206A-206D are virtual machines. As known in the art, a virtual machine is an instance of a software implementation of a machine (i.e. a computer) that executes applications like a physical machine. In the example of virtual machine, each of the servers 202A-202D can be configured to execute a hypervisor or another type of program configured to enable the execution of multiple instances 206 on a single server. Additionally, each of the instances 206 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances. For example, one or more of the instances 206A-206D can be physical machines (e.g., bare metal instances).

One or more server computers 204 can be reserved for executing software components for managing the operation of the server computers 202 and the instances 206. For example, the server computer 204 can execute a management component 210. A user can access the management component 210 to configure various aspects of the operation of the instances 206 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 212 can scale the instances 206 based upon rules defined by the user. In one embodiment, the auto scaling component 212 allows a user to specify scale-up rules for use in determining when new instances should be instantiated and scale-down rules for use in determining when existing instances should be terminated. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist users in the deployment of new instances 206 of computing resources. The deployment component can have access to account information associated with the instances, such as who is the owner of the account, credit card information, country of the owner, etc. The deployment component 214 can receive a configuration from a user that includes data describing how new instances 206 should be configured. For example, the configuration can specify one or more applications to be installed in new instances 206, provide scripts and/or other types of code to be executed for configuring new instances 206, provide cache logic specifying how an application cache should be prepared, and other types of information. The deployment component 214 can utilize the user-provided configuration and cache logic to configure, prime, and launch new instances 206. The configuration, cache logic, and other information may be specified by a user using the management component 210 or by providing this information directly to the deployment component 214. The instance manager can be considered part of the deployment component.

User account information 215 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc.

As shown, server computer 204 can optionally include a topology generator component 216. In other examples, however, the functionality of the topology generator component can be performed by a different sever computer of the compute service provider, or by an entity other than the compute service provider. The topology generator component 216 can generate network topology data (e.g., network topology data 104 of FIG. 1).

Compute service provider 200 further includes a monitoring server computer 218 comprising an event scope inference component 220. Monitoring server computer 218 can host a monitoring service such as monitoring service 102 of FIG. 1. In other examples, however, the monitoring service can be hosted by another server computer, such as server computer 204.

While a single monitoring server computer 218 is depicted, the monitoring service can alternatively be implemented by a plurality of server computers. Event scope inference component 220 can perform functionality similar to that described above for flow parsing and enrichment sub-service 112 and impacted flow signal generator sub-service 114 of FIG. 1.

In addition, compute service provider 200 includes a network traffic data collection service 222. Network traffic data collection service 222 can be implemented by one or more server computers of the compute service provider, or alternatively, one or more server computers external to the compute service provider. Although it is depicted separately from the monitoring server computer 218 and the server computer, network traffic data collection service 222 may be implemented by one of those server computers in other examples. Network traffic data collection service 222 can serve to collect network traffic data (e.g., user data flows 106 of FIG. 1).

A network 230 can be utilized to interconnect the server computers 202A-202D, the server computer 204, the monitoring server computer 218, and the network traffic data collection service 222. The network 230 can be a local area network (LAN) and can be connected to a Wide Area Network (WAN) 240 so that end users can access the compute service provider 200. It should be appreciated that the network topology illustrated in FIG. 2 has been simplified and that many more networks and networking devices can be utilized to interconnect the various computing systems disclosed herein.

While FIGS. 1 and 2 depict examples where user data flows are gathered on server computers and then exported to a central authority (e.g., monitoring server) for anomaly detection, the anomaly detection can alternatively be implemented directly on the server computers without departing from the scope of this disclosure. For example, for virtual machine instances run by hypervisors on server computers, the hypervisor or another piece of hardware on the server computer can include software configured to identify flow anomalies in real time. Similarly, when server computers are used as bare-metal instances, the server computers can themselves run software configured to identify flow anomalies in real time. In either case, the server computers can then export only anomalous flows for enrichment and aggregation, thereby reducing the time it takes for the monitoring server to identify an ongoing issue and reducing data volumes that need to be processed by the monitoring server. In such examples, the monitoring server can optionally perform enrichment of the reported anomalies. For example, upon receipt of a report from a server computer that connection timeouts are occurring for connections to a specific IP address, the monitoring server can determine a domain/application/service associated with that IP address in order to provide more meaningful information to any impacted users.

Figure 3:
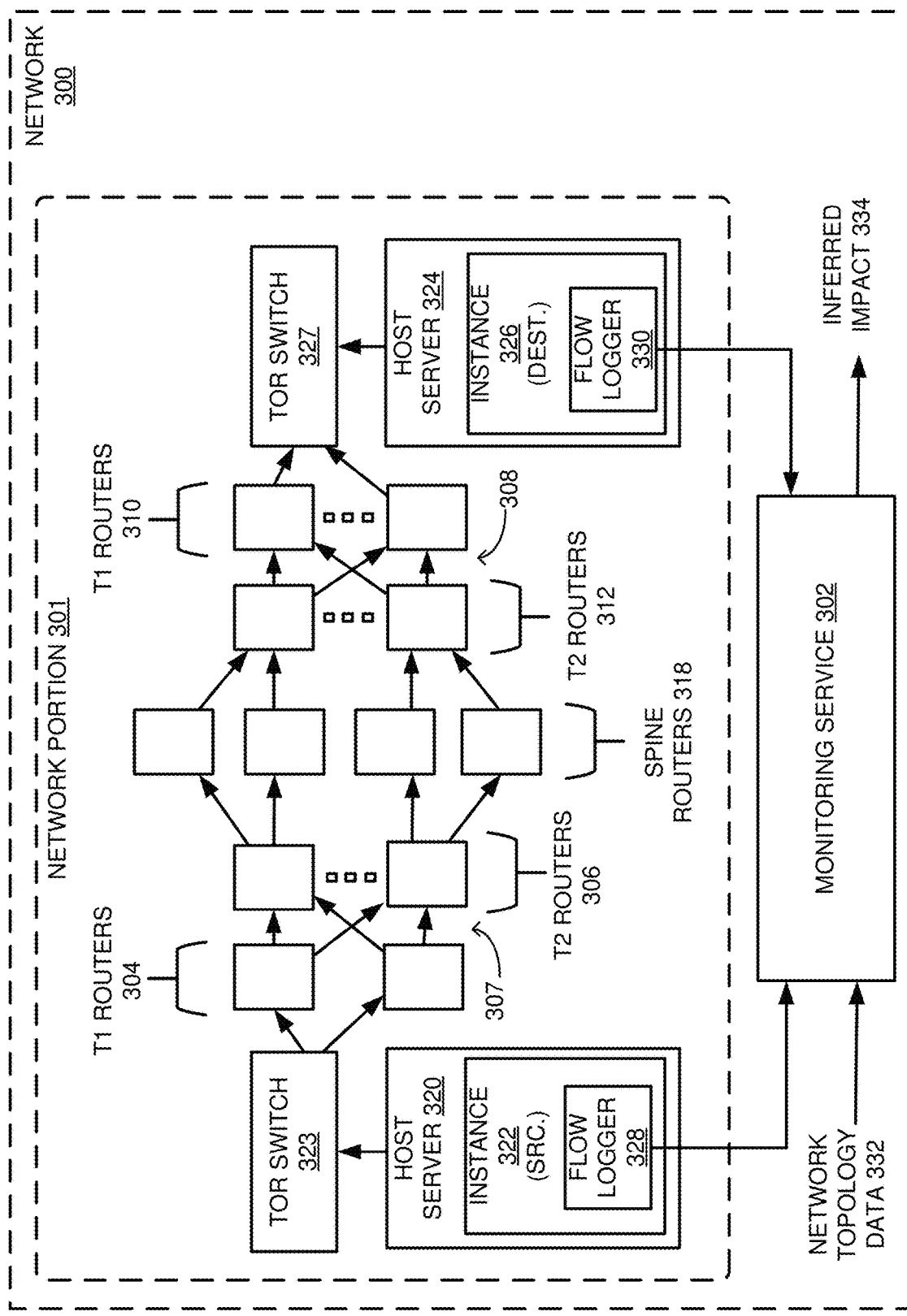
FIG. 3 shows an example system diagram showing a network and a topology of a portion thereof.

FIG. 3 illustrates an example network 300, including a detailed view of a network portion 301, which can be a portion of a larger area of network 300. Network 300 further includes a monitoring service 302, which can correspond to monitoring service 102 of FIG. 1, for example.

Network 300 can include multiple network devices arranged in various topologies, such as a leaf and spine architecture. In the depicted example, the network devices of network portion 301 are arranged in a particular leaf and spine architecture referred to as a Clos-type architecture. A network having a Clos-type architecture can include multiple leaves or bricks, each comprising a plurality of routers, as well as a plurality of spine routers. The individual routers of a brick can be arranged in one or more tiers. A first tier of routers (T1 routers) of a given brick can be connected to clients (e.g., servers hosting virtual machine instances) and to routers of a second tier of routers (T2 routers), but not to other T1 routers. The T2 routers can be connected to spine routers and to T1 routers, but not to other T2 routers. For example, a given T1 router of a brick can be connected directly to all of the T2 routers of that brick using different respective physical network links. A given T2 router of a brick can be connected directly to one or more of the spine routers using different respective physical network links.

Thus, connections between the different bricks can be indirect through the spine routers.

In particular, the depicted network portion 301 includes a first brick 307 including T1 routers 304 and T2 routers 306, a second brick 308 including T1 routers 310 and T2 routers 312, and a plurality of spine routers 318. The first and second bricks 307 and 304 can connect to the spine using various topologies. In the depicted non-limited example, each of the T2 routers of the respective bricks connect to a different router of the spine. While a single column of spine routers 318 is shown in network portion 301, other examples can include multiple columns of spine routers, with each column including one or more routers that provides an alternative path from one brick to another brick through the network area. In such examples, the different columns can be used to distribute the network traffic between the different bricks to provide redundancy and increase the capacity between the bricks. For example, each column can be given an equal weight and packets can be forwarded between the bricks and across the spine in accordance with a predetermined routing protocol (e.g., ECMP routing).

The bricks can connect to various clients. In the depicted example, the first brick 307 is connected to a host server 320 hosting a virtual machine instance 322 via a top-of-rack (TOR) switch 323. Similarly, the second brick 308 is connected to a host server 324 hosing a virtual machine instance 326 via a TOR switch 327. The TOR switches 323 and 327 can each be connected to other host servers (not shown), such that multiple host servers use the same TOR switch to communicate with the T1 bricks. While a single virtual machine instance is shown for each server for ease of description, each server may in fact host a plurality of such instances. Instances 322 and 326 can be examples of instances 206A-D shown in FIG. 2, for example.

Host server 320 and host server 324 can each include underlying hardware including one or more CPUs, memory, storage devices, etc. Running a layer above the hardware is a hypervisor or kernel layer. The hypervisor or kernel layer can be classified as a type 1 or type 2 hypervisor. A type 1 hypervisor runs directly on the host hardware to control the hardware and to manage the guest operating systems, whereas a type 2 hypervisor runs within a conventional operating system environment. Thus, in a type 2 environment, the hypervisor can be a distinct layer running above the operating system and the operating system can interact with the system hardware. Different types of hypervisors include Xen-based, Hyper-V, ESXi/ESX, Linux, etc., but other hypervisors can be used. The host servers can include a management layer, which can be part of the hypervisor or separated therefrom and generally includes device drivers needed for accessing the hardware. Further, the host servers can each be partitioned into a plurality of partitions, which are logical units of isolation, by the hypervisor. Each partition can be allocated its own portion of the hardware layer's memory, CPU allocation, storage, etc. Additionally, each partition can include a virtual machine instance (e.g., instance 322 or 326) and its own guest operating system. As such, each partition is an abstract portion of capacity designed to support its own virtual machine independent of the other partitions.

As shown, instance 326 includes a flow logger 328. Similarly, instance 326 includes a flow logger 330. Flow loggers 328 and 330 can include software configured to collect information regarding network traffic associated with the instances on which they are executed. The collected information can include user data flows such as user data flows 106 of FIG. 1, for example. As shown, the flow loggers can transmit the collected information to monitoring service 302. In other examples, however, each server (rather than each instance) can include a flow logger for the instances hosted thereon. Alternatively, the flow loggers can be implemented on routers (e.g., one or more of the T1 or T2 routers) to provide router-side flow logging.

The flow logs generated by the flow loggers can include information such as respective source IP addresses of user data flows, respective destination IP addresses of user data flows, respective source ports of user data flows, respective destination ports of user data flows, respective transport protocols of user data flows, virtual machine instance identifiers associated with user data flows, respective numbers of packets transferred in user data flows, respective numbers of packets returned from destinations of the user data flows, and/or respective transport protocol status flags for user data flows.

As indicated, instance 322 is the source of a data flow in the depicted example, whereas instance 326 is the destination of the data flow. In particular, network packets constituting the data flow can transit through network portion 301 from instance 322 to instance 326. The particular path through the various T1, T2, and spine routers that will be taken by the network packets depends on various factors, including the routing strategy being used (e.g., ECMP routing).

In addition to receiving data from flow loggers 328 and 330, monitoring service 302 also receives network topology data 332, as shown. Monitoring service 302 can also receive other inputs, such as network taxonomy data. Monitoring service 302 can use the various inputs to generate a determined (e.g., inferred) impact 334 of a network anomaly, such as an adverse network event causing network connectivity degradation, on one or more users of the compute service provider.

Figure 4:
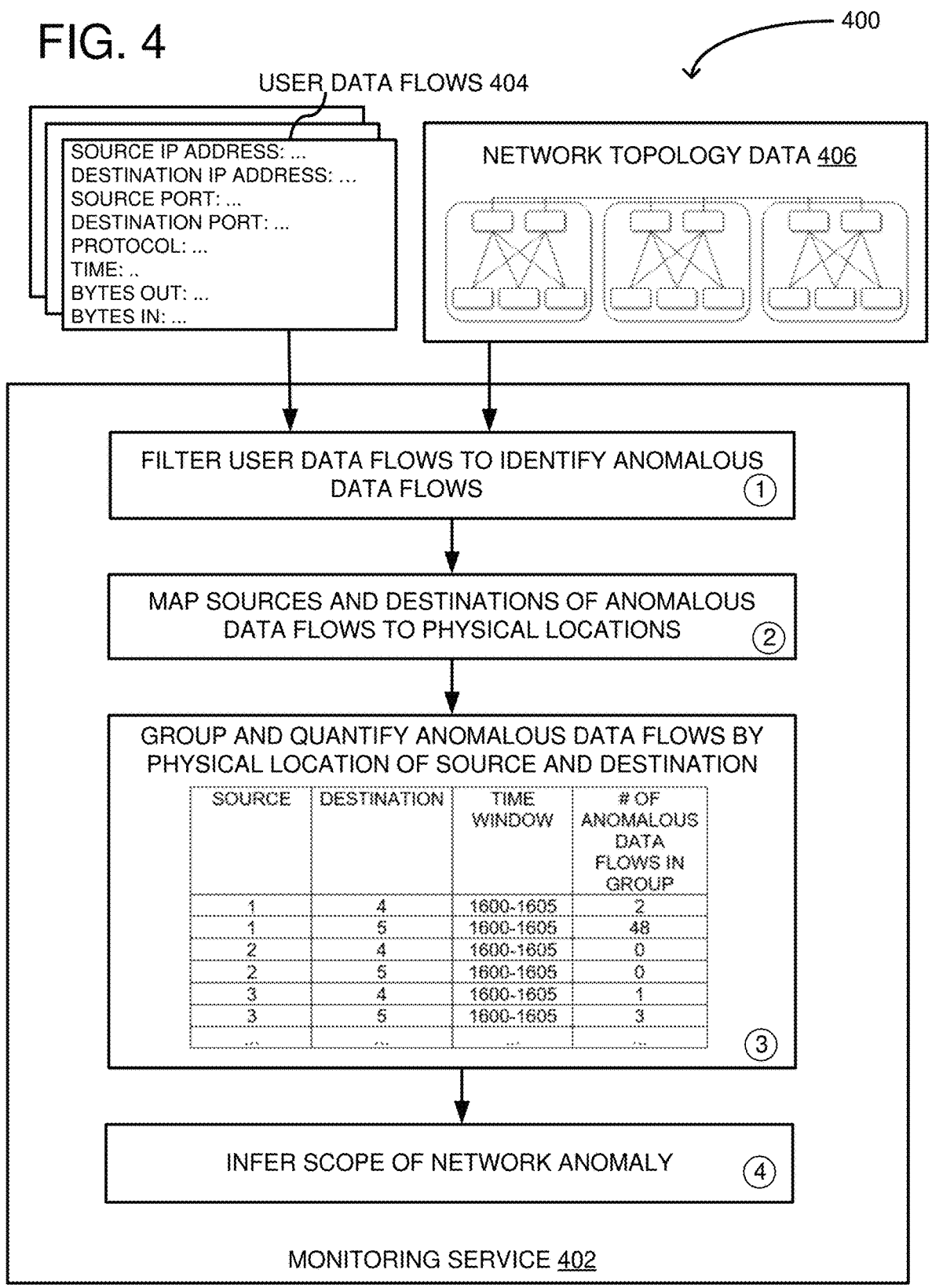
FIG. 4 shows inputs to an example monitoring service and example actions performed by the monitoring service to determine a scope of a network anomaly.

FIG. 4 illustrates an example diagram 400 of a process performed by a monitoring service 402 for determining (e.g., inferring) a scope of a network anomaly based on (e.g., based at least in part on) network traffic data for one or more users of a compute service provider and network topology data. Monitoring service 402 can perform functionality similar described above for monitoring service 102 of FIG. 1, for example.

As shown, a plurality of user data flows 404 are provided as inputs to monitoring service 402. User data flows 404 can correspond to user data flows 106 of FIG. 1, for example. In the depicted example, the respective user data flows include values for the following parameters: source IP address, destination IP address, source port, destination port, protocol, time, number of bytes out, and number of bytes in. In other examples, the respective user data flows can include values for fewer parameters, more parameters, or other parameters. Network topology data 406 is also provided as an input to monitoring service 402. Network topology data 406 can correspond to network topology data 104 of FIG. 1, for example.

In a first stage, the monitoring service filters the received user data flows to identify anomalous data flows. For example, this can include identifying a subset of the user data flows in which a non-zero number of bytes were sent to a destination and zero bytes were received from the destination in return.

In a second stage, sources and destinations of the anomalous data flows are mapped to physical locations. The physical locations can be specific network devices or areas within the network, or physical locations external to the network. Alternatively, the physical locations can be associated with network services or services external to the network. As discussed above with reference to FIG. 1, the monitoring service can perform this mapping using the network topology data, optionally in conjunction with other data such as network taxonomy data. As an illustrative example, the source IP addresses of user data flows 404 can be mapped to network areas or services identified as 1, 2, and 3, and the destination IP addresses of the user data flows can be mapped to network areas or services identified as 4 and 5.

In a third stage, the anomalous data flows are grouped and quantified by the physical location of their source and destination. The depicted table in the third stage continues with the illustrative example in which the user data flows each originate from a source network area or service 1, 2, or 3 and flow towards a destination network area or service 4 or 5. In particular, each row of the table represents one of the groups of anomalous data flows and indicates the source network area or service for the anomalous data flows in the group, the destination network area or service for the anomalous data flows in the group, the window of time during which the anomalous data flow occurred, and the number of anomalous data flows in the group. In the depicted non-limiting example, it can be seen that the group represented by the second row has a much larger number of anomalous data flows relative to the other groups.

In a fourth stage, a scope of a network anomaly is determined (e.g., inferred). The numbers of anomalous data flows in the respective groups can be analyzed to infer whether a network anomaly, such as a connection timeout, is likely impacting the user data flows in that group. On a high level, the analysis can include looking for a disproportionate occurrence of certain network areas or services among the anomalous data flows. As one non-limiting example, if all of the anomalous data flows have either a source or destination in network area or service 1, it can be inferred that network area or service 1 is likely the location of the network impairment.

The analysis can be performed using statistical methods to identify outliers (e.g., outlier detection). Outlier detection can involve identifying outliers within a dataset. Alternatively, the number of anomalous data flows in each group can be compared to a threshold, which can be a static threshold or dynamically-defined threshold. Continuing with the example shown in the table for the third stage, assuming the predetermined threshold is 10 for a given window of time, it can be inferred that a network anomaly may be impacting the user data flows having source network area or service 1 and destination network area or service 5 and occurring during the time window 1600-1605 (second row of the table), as the number of anomalous data flows in that group (48) exceeds the threshold. Further analysis of the anomalous data flows can then be performed to better estimate the scope of the network anomaly. For example, the monitoring service can review the numbers of anomalous data flows in the groups of anomalous data flows with source network area or service 1 or destination network area or service 5 for the same time window. In the depicted example, the group of anomalous data flows in the first row of the table also originate from source network area or service 1, but the group only contains two anomalous data flows (i.e., the number of anomalous data flows in this group is lower than the threshold of 10). Similarly, the groups of anomalous data flows in the fourth and sixth rows of the table also have the destination network area or service 5, but the respective numbers of anomalous data flows in these groups do not exceed the threshold of 10. Accordingly, the monitoring service can infer that the network anomaly is associated with the path between network area or service 1 and destination network area or service 5, as opposed to a network anomaly occurring at source network area or service 1 or destination network area or service 5. Thus, the scope of the network anomaly can include user data flows from source network area or service 1 to destination network area or service 5, as opposed to, for example, all user data flows originating from source network area or service 1, or all user data flows towards destination network area or service 5. While this example uses a static threshold of 10 for ease of explanation, statistical methods or dynamically-defined thresholds can instead be used.

In other examples, upon identifying multiple groups with large numbers of anomalous data flows having a common source, the monitoring service could infer that a network anomaly is occurring at that source. Similarly, upon identifying multiple groups with large numbers of anomalous data flows having a common destination, the monitoring service could infer that a network anomaly is occurring at that destination.

In addition to determining the scope of a network anomaly, the monitoring service can also determine (e.g., infer) additional details regarding the network anomaly using the network traffic information contained in the user data flows and the network topology information, among other inputs. These details can include, for example, which users are likely impacted by the network anomaly.

Figure 5:
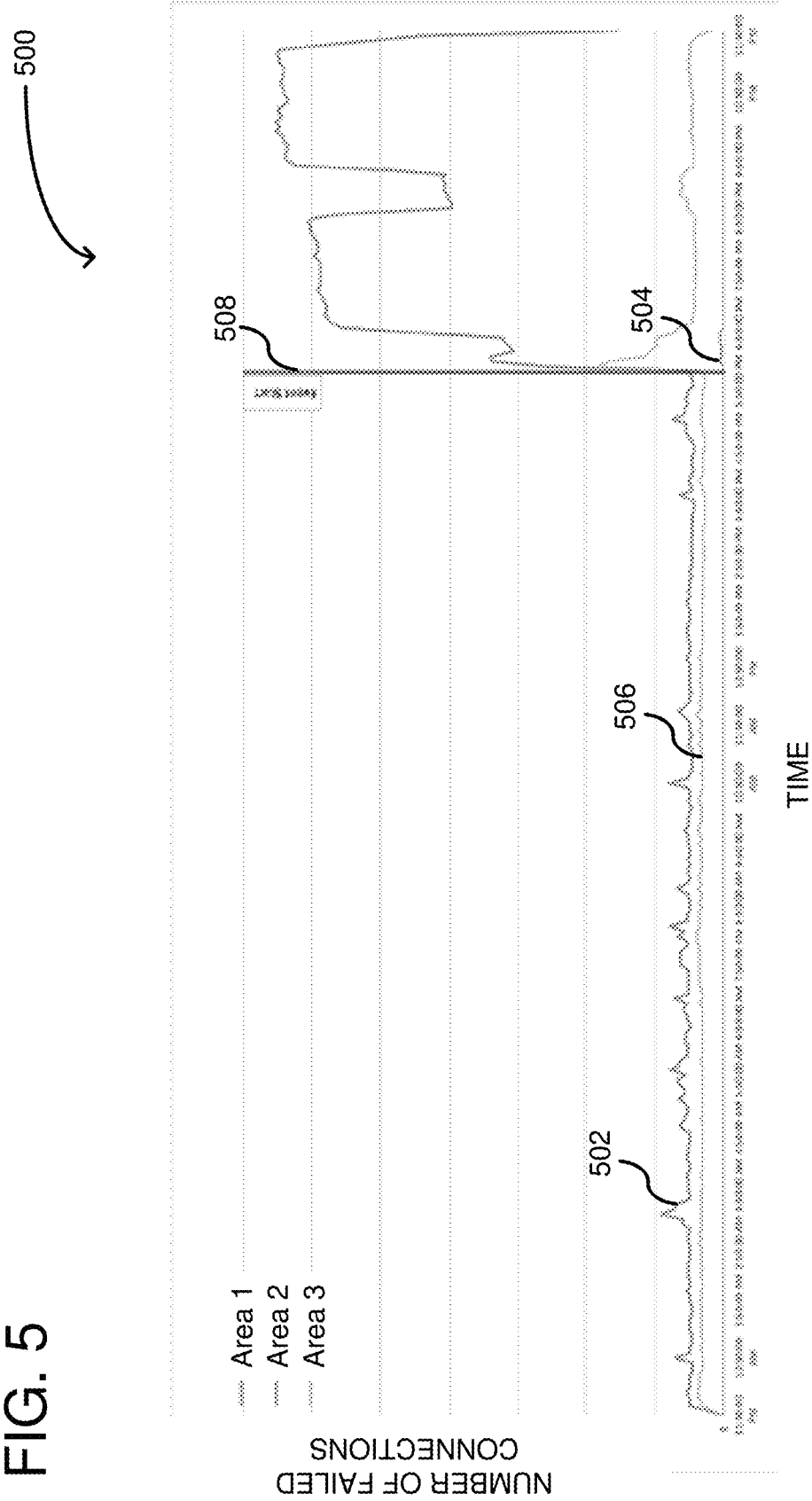
FIG. 5 shows example time series data indicating the number of failed connections in different areas of a network before and during a network connectivity disruption.

FIG. 5 shows an example timeline 500 showing the number of failed connections associated with three different network areas over a period of time, in the form of time series data. The X-axis of timeline 500 represents time, and the Y-axis of graph timeline represents the number of failed connections. As indicated, timeline 500 includes a graph 502 indicating the number of failed connections for a first network area (Area 1), a graph 504 indicating the number of failed connections for a second network area (Area 2), and a graph 506 indicating the number of failed connections for a third network area (Area 3). The start of a network anomaly is indicated at 508.

As used herein, "failed connections" can refer to user data flows in which a non-zero number of bytes was sent to a destination but no acknowledgement was received from the destination (e.g., as indicated by zero bytes being returned by the destination). In the depicted example, the number of failed connections in all three network areas is relatively low between 11:50:00 PM and 5:50:00 PM the following day. Then, between 5:50:00 PM and 6:50:00 PM, sharp increases in the number of failed connections in Areas 1 and 3 can be seen. In this example, the monitoring service infers the start of an adverse network event at 508. The inference of the start of the adverse network event can be based on statistical analysis of the user data flows for outliers, the number of failed connections exceeding a dynamically-determined threshold, the number of failed connections exceeding a static threshold, and/or other criteria.

Figure 6:
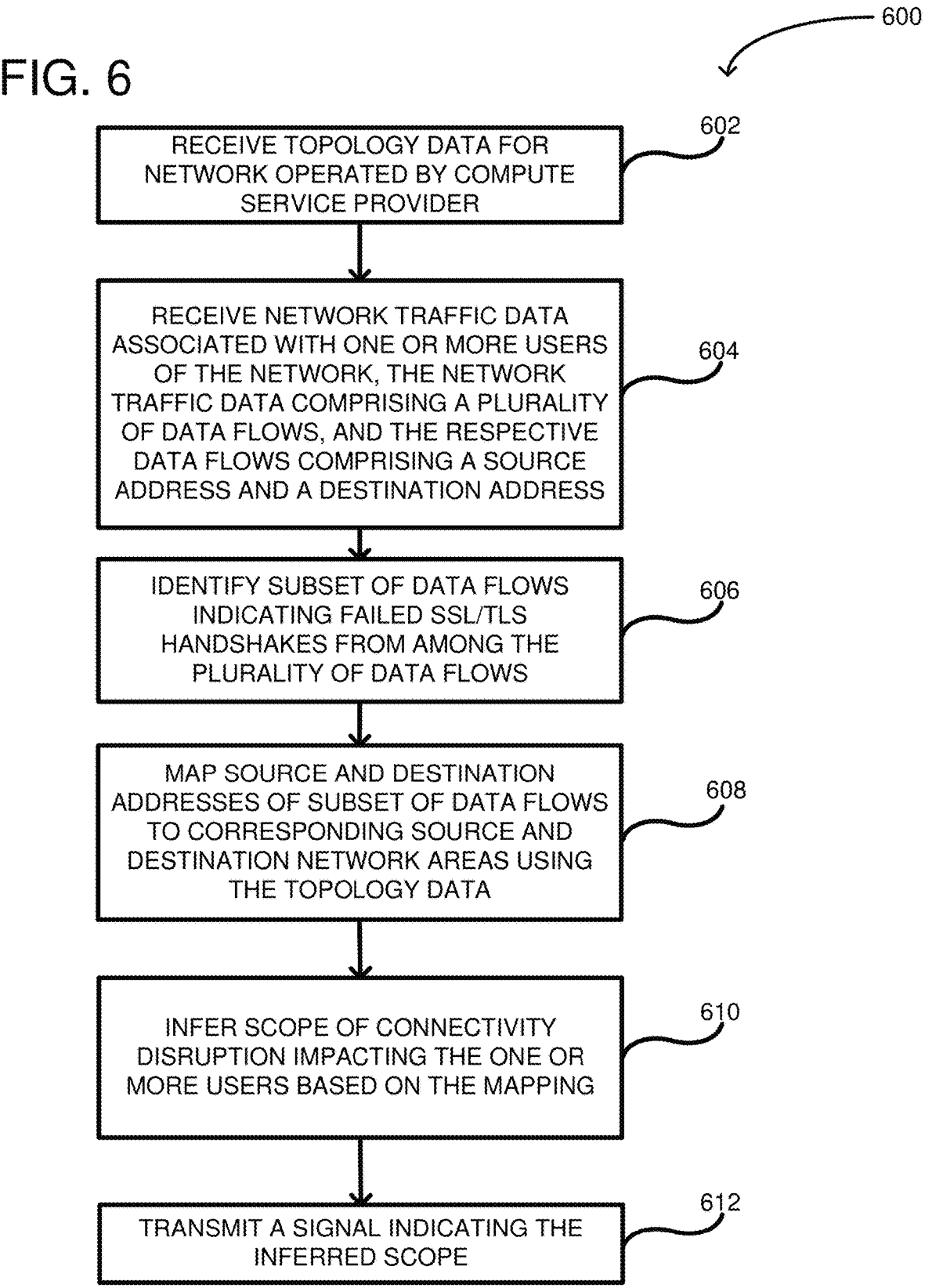
FIG. 6 is a flowchart of an example method of inferring a scope of a connectivity disruption impacting one or more users of a network operated by a compute service provider.

FIG. 6 is a flowchart 600 according to one embodiment for inferring a scope of a connectivity disruption impacting one or more users of a compute service provider. The inference can be performed by a monitoring server such as monitoring server computer 218 of FIG. 2, for example. In process block 602, topology data for a network operated by a compute service provider is received. In process block 604, network traffic data associated with one or more users of the network is received. The received network traffic data comprises a plurality of data flows, and the respective data flows comprise a source address and a destination address.

In process block 606, a subset of data flows indicating failed SSL/TLS handshakes is identified from among the plurality of data flows. For example, a given user data flow can be associated with a failed SSL/TLS handshake if it has a destination port of 443 (the HTTPS port), a routing protocol of 6 (indicating that the TCP protocol was used), a non-zero number of bytes sent to the destination, and zero bytes returned by the destination.

In process block 608, source and destination addresses of the subset of data flows are mapped to corresponding source and destination network areas using the topology data. In process block 610, a scope of connectivity disruption impacting the one or more users is inferred based on (e.g., based at least in part on) the mapping. In process block 612, a signal indicating the inferred scope is transmitted. For example, the signal can be transmitted to one or more users with resources within the inferred scope (e.g., users likely to impacted by the connectivity disruption). The one or more users can include an administrator or owner of an application or service, a user of an application or service, etc.

Figure 7:
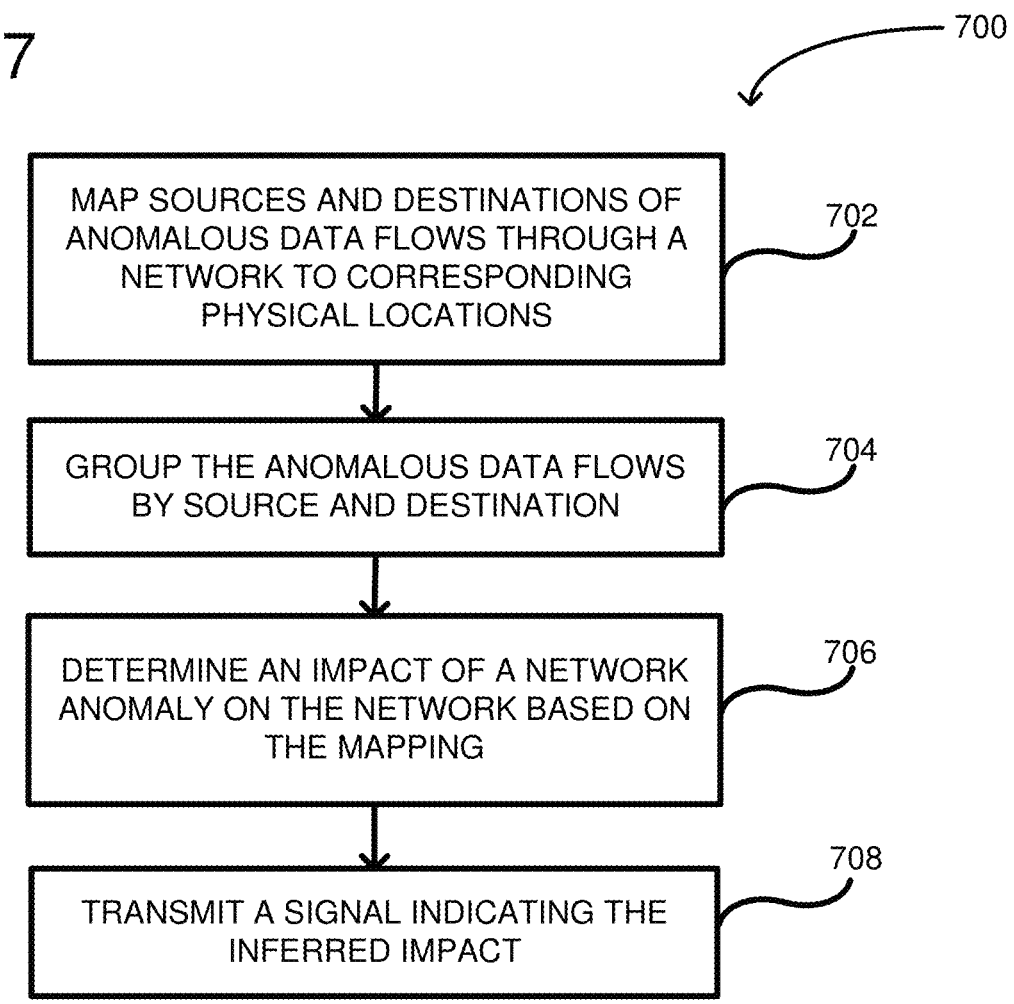
FIG. 7 is a flowchart of an example method of determining an impact of a network anomaly on a network.

FIG. 7 is a flowchart 700 according to one embodiment for determining (e.g., inferring) an impact of a network anomaly on a network. As discussed above, a network anomaly can refer to a network connectivity disruption resulting in failed connections (e.g., connection timeouts). In some examples, the network anomaly is associated with a destination external to the network, such as an external Internet service. The determination of the impact of the network anomaly can be performed by a monitoring server such as monitoring server computer 218 of FIG. 2, for example.

In process block 702, sources and destinations of anomalous data flows through a network are mapped to corresponding physical locations. In one example, a monitoring server (e.g., monitoring server computer 218 of FIG. 2) can receive data flows logged at one or more other server computers (e.g., server computers 202A, 202B, and 202C of FIG. 2). The monitoring server can identify anomalous data flows from among the received data flows prior to performing the mapping. In another example, the server computers at which the data flows are logged (and which originate the data flows) can themselves identify anomalous data flows from among the logged data flows. The server computers can then send only the anomalous data flows to the monitoring server, and the monitoring server can perform the mapping on the received anomalous data flows.

In process block 704, the anomalous data flows are grouped by source and destination. In process block 706, an impact of a network anomaly on the network is determined based on (e.g., based at least in part on) the mapping. In process block 708, a signal indicating the determined impact is transmitted, e.g. to the one or more users impacted by the network anomaly. In some examples, the transmission of the signal indicating the determined impact can lead to the performance of actions to mitigate the impact of the network anomaly, such as the recommended actions discussed above with reference to FIG. 1.

Figure 8:
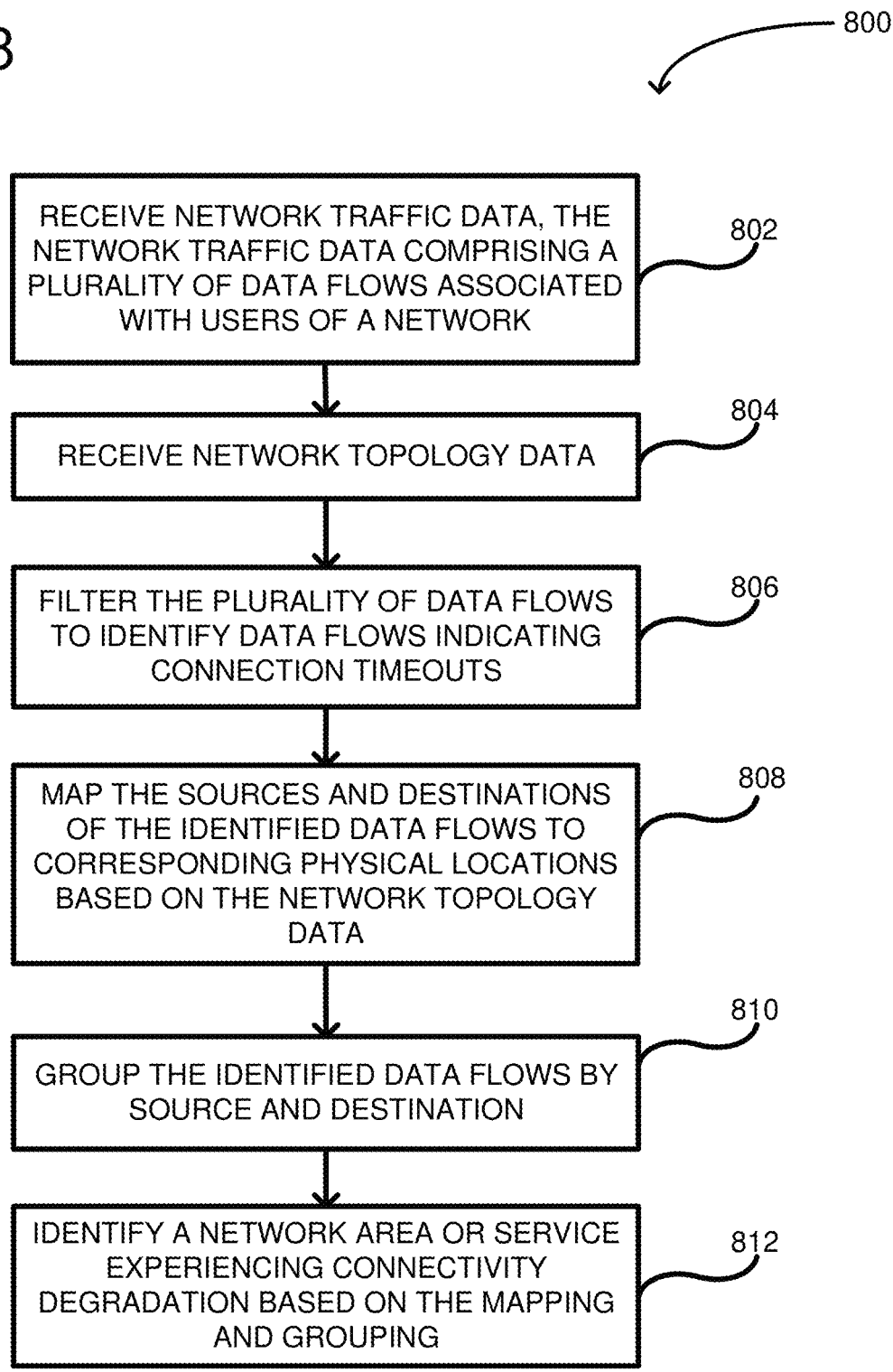
FIG. 8 is a flowchart of an example method of identifying a network area or service experiencing connectivity degradation.

FIG. 8 is a flowchart 800 according to one embodiment for identifying a network area or service experiencing connectivity degradation. The identification of the network area or service experiencing connectivity degradation can be performed by a monitoring server such as monitoring server computer 218 of FIG. 2, for example.

In process block 802, network traffic data is received. The received network traffic data comprises a plurality of data flows associated with users of a network. In process block 804, network topology data is received. In process block 806, the plurality of data flows are filtered to identify data flows indicating connection timeouts. As discussed above, this can include filtering the plurality of data flows to identify data flows with failed attempts by a source to connect to a destination (e.g., an external HTTP/HTTPS endpoint), which in turn can be indicated by the source sending packets to the destination and receiving no packets in return. Optionally, rather than the filtering being performed at a central authority such as a monitoring server, server computers at which the data flows are logged can themselves perform the filtering, and provide only those data flows indicating connection timeouts to the central authority.

In process block 808, the sources and destinations of the identified data flows are mapped to corresponding physical locations based on the network topology data. In process block 810, the identified data flows are grouped by source and destination, e.g., in the manner discussed above with reference to FIG. 4. In process block 812, a network area or service experiencing connectivity degradation is identified based on the mapping and grouping. In some examples, the identification of the network area or service experiencing connectivity degradation is performing using a statistical method such as outlier detection.

Figure 9:
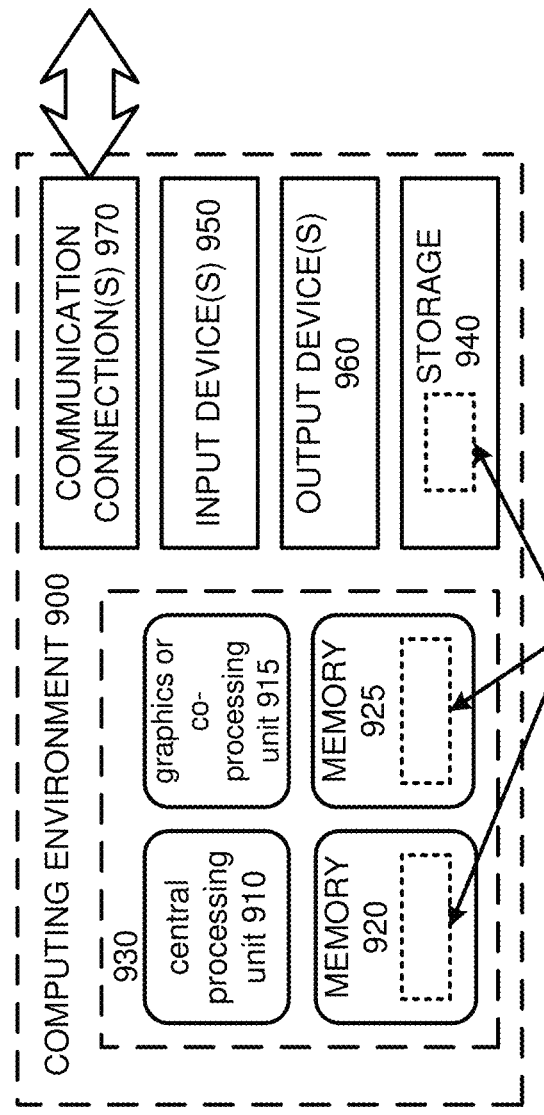
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of inferring a scope of a connectivity disruption impacting one or more users of a computer network operated by a compute service provider, the method comprising:
   receiving topology data for the network;
   receiving network traffic data associated with the one or more users, the network traffic data comprising a plurality of data flows, and the respective data flows comprising a source address and a destination address;
   identifying a subset of data flows indicating failed Secure Sockets Layer/Transport Layer Security (SSL/TLS) handshakes from among the plurality data flows, wherein identifying the subset of data flows indicating failed SSL/TLS handshakes from among the plurality of data flows comprises identifying data flows which failed to receive an acknowledgement signal from their respective destination addresses;
   mapping the source and destination addresses of the subset of data flows to a corresponding service in the compute service provider using the topology data;
   inferring a scope of a connectivity disruption impacting the one or more users based on the mapping to the service; and
   transmitting a signal indicating the inferred scope.

2. The method of claim 1, wherein identifying the data flows which failed to receive an acknowledgement signal from their respective destination addresses comprises identifying data flows in which a number of bytes sent from the source address to the destination address is greater than zero and a number of bytes returned from the destination address to the source address is equal to zero.

3. The method of claim 1, wherein inferring the scope of the connectivity disruption comprises:
grouping the data flows in the subset of data flows by source network area and destination network area;
counting the data flows in the respective groups;
determining that a number of data flows for a particular network area exceeds a predefined threshold; and
inferring that the scope of the connectivity disruption includes the particular network area.

4. The method of claim 3, further comprising identifying the one or more users impacted by the connectivity disruption based on the particular network area and the network traffic data, wherein transmitting the signal comprises transmitting the signal to the one or more users impacted by the connectivity disruption.

5. The method of claim 3, further comprising redirecting network traffic away from the particular network area.

6. A method, comprising:
mapping sources and destinations of anomalous data flows through a network to corresponding physical locations, wherein the anomalous data flows are identified failed Secure Sockets Layer/Transport Layer Security (SSL/TLS) handshakes, and wherein the anomalous data flows comprise data flows indicating a failure to receive an acknowledgement signal from their respective destinations;
grouping the anomalous data flows by source and destination;
associating the anomalous data flows with a service associated with a compute service provider;
determining an impact of a network anomaly on the service based on the mapping; and
transmitting a signal indicating the determined impact.

7. The method of claim 6, wherein the data flows indicating a failure to receive an acknowledgement signal from their respective destinations comprise data flows in which a number of bytes sent from the source of the data flow to the destination of the data flow is greater than zero and a number of bytes returned from the destination of the data flow to the source of the data flow is equal to zero.

8. The method of claim 6, wherein the anomalous data flows comprise data flows indicating one or more of: an unanswered Domain Name System (DNS) request, a Transmission Control Protocol (TCP) reset, an unanswered TCP synchronization request, packet misordering, packet latency, or packet loss.

9. The method of claim 6, further comprising receiving topology data for the network, wherein the mapping of the sources and destinations of the anomalous data flows to the corresponding physical locations is based on the topology data.

10. The method of claim 9, further comprising receiving taxonomy data for the network, wherein the mapping of the sources and destinations of the anomalous data flows to the corresponding physical locations is further based on the taxonomy data.

11. The method of claim 6,
wherein a monitoring server communicatively coupled to the network performs the mapping, grouping, and transmitting,
wherein one or more other servers communicatively coupled to the network originate data flows through the network and log the data flows, and
wherein, prior to the mapping, the monitoring server receives the logged data flows from the one or more other servers and identifies the anomalous data flows from among the logged data flows.

12. The method of claim 6,
wherein a monitoring server communicatively coupled to the network performs the mapping, grouping, and transmitting,
wherein one or more other servers communicatively coupled to the network originate data flows through the network, log the data flows, and identify the anomalous data flows from among the logged data flows; and
wherein, prior to the mapping, the monitoring server receives the anomalous data flows from the one or more other servers.

13. The method of claim 6, wherein determining the impact of the network anomaly based on the physical location corresponding to the particular group comprises identifying, based on the topology data, the service associated with the physical location corresponding to the particular group, and wherein transmitting the signal indicating the determined impact comprises transmitting a signal indicating the identified service.

14. The method of claim 13, wherein the respective data flows of the plurality of data flows indicate a user of the network associated with the data flow, wherein the method further comprises determining one or more users impacted by the network anomaly based on the users indicated in the plurality of data flows and the identified service, and wherein the signal indicating the identified network area or service is transmitted to the one or more users impacted by the network anomaly.

15. The method of claim 14, wherein the signal indicating the identified network area or service further comprises an indication of a recommended action to be taken by the one or more users impacted by the network anomaly.

16. A system, comprising:
a network;
a monitoring server communicatively coupled to the network, the monitoring server operable to:
receive network traffic data, the network traffic data comprising a plurality of data flows associated with users of the network;
receive network topology data;
filter the plurality of data flows to identify data flows indicating failed Secure Sockets Layer/Transport Layer Security (SSL/TLS) handshakes;
map sources and destinations of the identified data flows to corresponding physical locations based on the network topology data;
group the identified data flows by source and destination; and
identify a service associated with a compute service provider experiencing connectivity degradation based on the mapping and grouping,
wherein the failed SSL/TLS handshakes indicate failures of the sources of the data flows to obtain acknowledgement signals from their respective destinations.

17. The system of claim 16, wherein the monitoring server is further operable to:
transmit a signal to one or more of the users, the signal comprising an indication of the service experiencing connectivity degradation.

18. The system of claim 16, wherein the identification of the service experiencing connectivity degradation is performing using outlier detection.

19. The system of claim 16, wherein for a given data flow, a failure of the source of the data flow to obtain a response from the destination of the data flow comprises a number of bytes sent from the source of the data flow to the destination of the data flow being greater than zero and a number of bytes returned from the destination of the data flow to the source of the data flow being equal to zero.

* * * * *